United States Patent
Kazui et al.

(10) Patent No.: US 6,282,243 B1
(45) Date of Patent: *Aug. 28, 2001

(54) APPARATUS AND METHOD FOR INTERFRAME PREDICTIVE VIDEO CODING AND DECODING WITH CAPABILITIES TO AVOID ROUNDING ERROR ACCUMULATION

(75) Inventors: Kimihiko Kazui; Akira Nakagawa; Eishi Morimatsu, all of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/972,362

(22) Filed: Nov. 18, 1997

(30) Foreign Application Priority Data

Jun. 11, 1997 (JP) .................................................... 9-171087
Jun. 20, 1997 (JP) .................................................... 9-164247

(51) Int. Cl.⁷ ............................... H04N 7/36; H04N 7/50
(52) U.S. Cl. .................................. 375/240.16; 348/402.1; 348/416.1
(58) Field of Search ............................. 375/240, 240.16; 348/415, 416, 413, 402, 402.1, 413.1, 415.1, 416.1; H04N 7/36, 7/50

(56) References Cited

U.S. PATENT DOCUMENTS 5,054,103 * 10/1991 Yasuda ............................... 348/261.2
5,418,570 * 5/1995 Ueno .................................... 348/413
5,751,359 * 5/1998 Suzuki ................................. 348/405

* cited by examiner

Primary Examiner—Howard Britton
(74) Attorney, Agent, or Firm—Staas & Halsey LLP

(57) ABSTRACT

A method and apparatus for interframe predictive video coding and decoding which avoid the accumulation of rounding errors and thus obtain high-quality reproduced pictures. A frame memory outputs at least one reference picture to a prediction picture calculation unit, according to motion vector information with half-pel accuracy. From the reference picture(s), the prediction picture calculation unit produces a prediction picture by performing interpolation operations if the motion vector has a half-pel component. Here, each interpolated pel value is rounded off to an integer according to a particular rounding algorithm specified by a calculation controller. More specifically, the prediction picture calculation unit supports a first algorithm that rounds off the pel values toward positive infinity and a second algorithm that rounds off them toward negative infinity. The calculation controller outputs a rounding control signal that directs the prediction picture calculation unit to select either of those two algorithms with substantially equal probabilities of occurrence.

44 Claims, 15 Drawing Sheets

| SUM OF FOUR PEL VALUES (G) | PEL VALUE ROUNDED TOWARD NEGATIVE INFINITY | PEL VALUE ROUNDED TOWARD POSITIVE INFINITY | PEL VALUE ROUNDED |
|---|---|---|---|
| 4 (4N) | (4 + 1) >> 2 = 1 | (4 + 2) >> 2 = 1 | ALWAYS TOWARD NEGATIVE INFINITY |
| 5 (4N + 1) | (5 + 1) >> 2 = 1 | (5 + 2) >> 2 = 1 | ALWAYS TOWARD NEGATIVE INFINITY |
| 6 (4N + 2) | (6 + 1) >> 2 = 1 | (6 + 2) >> 2 = 2 | DEPENDING ON ROUNDING DIRECTION |
| 7 (4N + 3) | (7 + 1) >> 2 = 2 | (7 + 2) >> 2 = 2 | ALWAYS TOWARD POSITIVE INFINITY |

FIG. 6

|  | (Vx_half, Vy_half) = (0, 0) | (Vx_half, Vy_half) = (1, 0) | (Vx_half, Vy_half) = (0, 1) | (Vx_half, Vy_half) = (1, 1) |
|---|---|---|---|---|
| SELECTION COMMAND SIGNAL #1 | 0 | 1 | 0 | 1 |
| SELECTION COMMAND SIGNAL #2 | 0 | 0 | 1 | 1 |
| SELECTION COMMAND SIGNAL #3 | 0 | 0 | 0 | 1 |
| SHIFT COMMAND SIGNAL | 0 | 1 | 1 | 2 |

FIG. 7

| ROUNDING DIRECTION | (Vx_half, Vy_half) = (0, 0) | (Vx_half, Vy_half) = (1, 0) | (Vx_half, Vy_half) = (0, 1) | (Vx_half, Vy_half) = (1, 1) |
|---|---|---|---|---|
| TOWARD POSITIVE INFINITY | 0 | 1 | 1 | 2 |
| TOWARD NEGATIVE INFINITY | 0 | 0 | 0 | 1 |

| MOTION VECTOR VALUE | | EXAMPLE | | |
|---|---|---|---|---|
| INTEGER PART | HALF-PEL COMPONENT | VECTOR COMPONENT (Vx OR Vy) | INTEGER PART (Vx' OR Vy') | HALF-PEL COMPONENT (Vx_half OR Vy_half) |
| POSITIVE | PRESENT | 2.5 | 2 | 1 |
| POSITIVE | ABSENT | 2 | 2 | 0 |
| NEGATIVE | PRESENT | 2.5 | −3 | 1 |
| NEGATIVE | ABSENT | 2 | −2 | 0 |

APPARATUS AND METHOD FOR INTERFRAME PREDICTIVE VIDEO CODING AND DECODING WITH CAPABILITIES TO AVOID ROUNDING ERROR ACCUMULATION

BACKGROUND OF THE INVENTION

1. Field of the Invention

The present invention relates to an interframe redictive video coding apparatus and decoding apparatus, and also to an interframe predictive video coding method and decoding method.

2. Description of the Related Art

Interframe predictive coding is known as a video coding technique that enables highly efficient compression of motion image signals. This technique compresses video information by taking advantage of high similarity between each frame and the next (i.e., temporal coherency). More specifically, when encoding a given frame, the coder generates a prediction frame by applying motion vectors to the previous frame, calculates the difference between the predictive frame and the present frame, encodes the difference and motion vectors into compact variable-length codewords, and transmits them in the form of a coded bitstream.

There are several international standards in the technological field of motion video coding, e.g., ITU-T H.263, ISO/IEC MPEG-1 (Moving Picture Experts Group 1), and ISO/IEC MPEG-2. All those coding standards have adopted highly efficient algorithms that predict intermediate frames from two reference pictures. More specifically, such advanced algorithms include the following.

1) Bidirectional Frame Prediction

This algorithm, exploiting the time correlation between frames, creates a prediction picture from the previous and next frames, thus making a bidirectional prediction.

2) Half-pel Motion Estimation

This algorithm treats motion vectors with half pel (picture element) accuracy and calculates pel values at half-pel positions from the adjacent pels to produce a prediction picture.

Both algorithms obtain prediction pictures by using interpolation techniques on the basis of mean value calculations. More specifically, the bidirectional frame prediction computes a prediction picture f(x, y) by the following equation (1).

$$f(x, y)=(g_{for}(x+Vx_{for}, Y+VY_{for})+g_{back}(x+Vx_{back}, y+Vy_{back}))/2 \quad (1)$$

where g(x,y) represents a reference picture obtained by locally decoding video data after quantization, Vx and Vy are X-axis and Y-axis components of a motion vector, and the suffixes "for" and "back" denote forward prediction and backward prediction, respectively.

In the case of the half-pel motion estimation, the prediction picture f(x,y) is obtained by either one of the following four equations (2a) to (2d), depending on the presence of half-pel components of a motion vector as will be explained later.

$$f(x, y)=g(x+Vx', y+Vy') \quad (2a)$$

$$f(x, y)=(g(x+Vx', y+Vy')+g(x+Vx'+1, y+Vy'))/2 \quad (2b)$$

$$f(x, y)=(g(x+Vx', y+Vy')+g(x+Vx', y+Vy'+1))/2 \quad (2c)$$

$$f(x, y)=(g(x+Vx', y+Vy')+g(x+Vx'+1, y+Vy')+g(x+Vx', y+Vy'1)+g(x+Vx'+1, y+Vy'+1))/4 \quad (2d)$$

where Vx' and Vy' represent the integer parts of motion vector components Vx and Vy, respectively.

Equation (2a) is used to calculate a prediction picture f(x, y) when neither of the X-axis and Y-axis motion vector components, Vx and Vy, has a half-pel component. Equation (2b) gives a prediction picture f(x, y) when the motion vector component Vx has a half-pel component but the Y-axis component Vy does not. Equation (2c) gives a prediction picture f(x, y) when, in turn, the motion vector component Vx has no half-pel component but the Y-axis component Vy has one. Equation (2d) provides a prediction picture f(x, y) when both of the X-axis and Y-axis motion vector components Vx and Vy have a half-pel component.

In that way, the picture prediction is achieved by either one of the four different equations (2a) to (2d) depending on the presence of half-pel components in a motion vector. This is because the motion vector resolution is extended to half-pel accuracy in this motion estimation algorithm, and the interpolation of pel values should be conducted in different ways depending on the half-pel components.

The values of motion vector components, Vx and Vy, is classified as shown in FIG. 12 in terms of the polarity of their respective integer parts Vx' and Vy' and the presence of half-pel components. Here, the symbols "Vx-half" and "Vy-half" are binary values that express the presence ("1") or absence ("0") of a half-pel component in the motion vector component Vx or Vy.

In the meantime, the aforementioned international standard coding systems treat the pel values as integer variables. It is therefore necessary, in the above-described interpolation operations, to round off the resultant pel values to integer values. The standard coding systems actually require each pel value to be rounded to the nearest integer, and particularly if its decimal fraction is exactly 0.5, the pel value must be rounded toward the direction away from zero. With this definition, fractional values 3/2, 5/4, and 7/4, for example, will be rounded off to 2, 1, and 2, respectively. Since the pel values are usually represented in positive integers in motion compensation, the above rounding method can be paraphrased as "rounding off toward the positive infinity."

As described above, the interpolated pel values are rounded off to integers; however, this rounding operation may introduce some errors to predicted pictures. Take a pel value of 1.5 for instance. There exists an error of 0.5 between the original value 1.5 and the rounded value 2. Since the interframe predictive coding system uses a locally decoded picture of the immediately preceding frame as a reference to the next frame, errors in the prediction picture would accumulate as the frame sequence proceeds, unless the difference between the predicted pels and entered pels is not transmitted to the decoding ends.

FIG. 13 shows how the rounding errors accumulate in the case that the interpolated pel values are rounded upward, or toward positive infinity. In contrast to this, FIG. 14 shows how the rounding errors accumulate in the case that the interpolated pel values are rounded downward, or toward negative infinity.

In both FIGS. 13 and 14, the square cells represent individual pels, and the figures within the cells show their respective pel values. The symbol "IT" indicates frame counter values, which increases as the frame sequence advances. The hatched cells represent predicted images of an object that is moving in the +X direction at the rate of 0.5 pel per frame. FIGS. 13 and 14 illustrate how this moving object image varies with time, where the pel values of the background image are all set to zeros in the initial frame (T=0) for illustrative purposes. It should be noted that, in the frame of T=1, both ends of the object image are actually located at half-pel grids.

As FIGS. 13 and 14 show, the interpolation introduces some softness in the distribution curve of pel values because of the effect of averaging between pels. It has to be noted here that the summations of all pel values including background exhibit an increase of 3 at every frame transition, as indicated by the "Total=" notes on the right hand side of FIG. 13. On the other hand, the same measurement in FIG. 14 shows a decrease of 3 at every frame transition.

For comparison, FIG. 15 presents a result of interpolation performed in the same situation except that the rounding operations are disabled. In this case, the pel values, being handled as real number variables, do not show any variations in their totals.

The above-mentioned coding standards MPEG-1 and MPEG-2 require intra-coded pictures to be inserted forcibly into the output picture sequence at predetermined frame intervals. They also assume such application environments where coders and decoders can communicate at relatively higher bitrates. Those constraints make it possible to deliver the prediction errors, or the difference between predicted pel values and source pel values, to the decoders without reducing the information. Therefore, the problem of rounding error accumulation discussed above will never occur in MPEG-1 or MPEG-2 video coding.

In the H.263 recommendation, however, the prediction errors do not always reach the receiving ends because H.263 assumes the use in low bitrate communication environments such as existing analog telephone lines. In extreme cases, it can happen that most of the transmission bandwidth is spent only for motion vector data and there is no room remained for sending prediction error information. Moreover, the H.263 encoders are unable to insert intra-coded pictures frequently, because the intraframe coding produces a large amount of coded data. All those restricted situations pose an error accumulation problem to H.263, which would typically appear as picture quality degradation, such as a change in color tones from white to red, for example, observed in the reconstructed pictures.

SUMMARY OF THE INVENTION

Taking the above into consideration, an object of the present invention is to provide a method and apparatus for interframe predictive video coding and decoding which avoid the accumulation of rounding errors and thus make it possible to obtain high-quality reproduced pictures.

To accomplish the above object, according to the present invention, there is provided a video coding apparatus for performing an interframe predictive coding, which has a prediction picture generator to produce a prediction picture from a reproduced video image and a motion vector. This video coding apparatus comprises the following key elements:

(a) a frame memory, disposed in the prediction picture generator, for storing a video image reconstructed as a reference picture, and outputting at least one reference picture according to motion vector information;

(b) a prediction picture calculation unit, disposed in the prediction picture generator, for producing a prediction picture by interpolation operations including a rounding process, based on the at least one reference picture supplied from the frame memory according to the motion vector information; and (c) a calculation control unit, disposed in the prediction picture generator, for controlling the rounding process performed by the prediction picture calculation unit.

To accomplish the above object, according to the present invention, there is provided a video decoding apparatus for decoding predictive-coded pictures, which has a prediction picture generator to produce a prediction picture from a reproduced video image and a motion vector. This video decoding apparatus comprises the following key elements:

(a) a frame memory, disposed in the prediction picture generator, for storing a video image reconstructed as a reference picture, and outputting at least one reference picture according to motion vector information;

(b) a prediction picture calculation unit, disposed in the prediction picture generator, for producing a prediction picture by interpolation operations including a rounding process, based on the at least one reference picture supplied from the frame memory according to the motion vector information; and (c) a calculation control unit, disposed in the prediction picture generator, for controlling the rounding process performed by the prediction picture calculation unit.

Further, to accomplish the above object, according to the present invention, there is provided a method of coding video images with an interframe prediction technique which produces a prediction picture by interpolation operations with a rounding process, based on at least one reference picture. This method comprises adaptively determining a rounding direction as a parameter of the rounding process by selecting either rounding toward positive infinity or rounding toward negative infinity, each time a predetermined number of pels are coded.

Furthermore, to accomplish the above object, according to the present invention, there is provided a method of decoding a video bitstream encoded with an interframe prediction technique, which produces a prediction picture by interpolation operations with a rounding process, based on at least one reference picture. This method comprises adaptively determining a rounding direction as a parameter of the rounding process by selecting either rounding toward positive infinity or rounding toward negative infinity, each time a predetermined number of pels are decoded.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 6 is a diagram which shows the relation of summation G versus rounding direction;

FIG. 7 is a diagram which summarizes selection command signals and a shift command signal generated by the calculation controller, with respect to the presence of half-pel components;

FIG. 8 is a diagram which summarizes the values of a rounding command signal generated by the calculation controller, with respect to the rounding direction and the presence of half-pel components;

FIG. 12 is a diagram which shows how the values of motion vectors are classified in conventional systems, in terms of the polarity of their integer part and the presence of half-pel components;

DESCRIPTION OF THE PREFERRED EMBODIMENTS

Four embodiments of the present invention will be described below with reference to the accompanying drawings.

Figure 1:
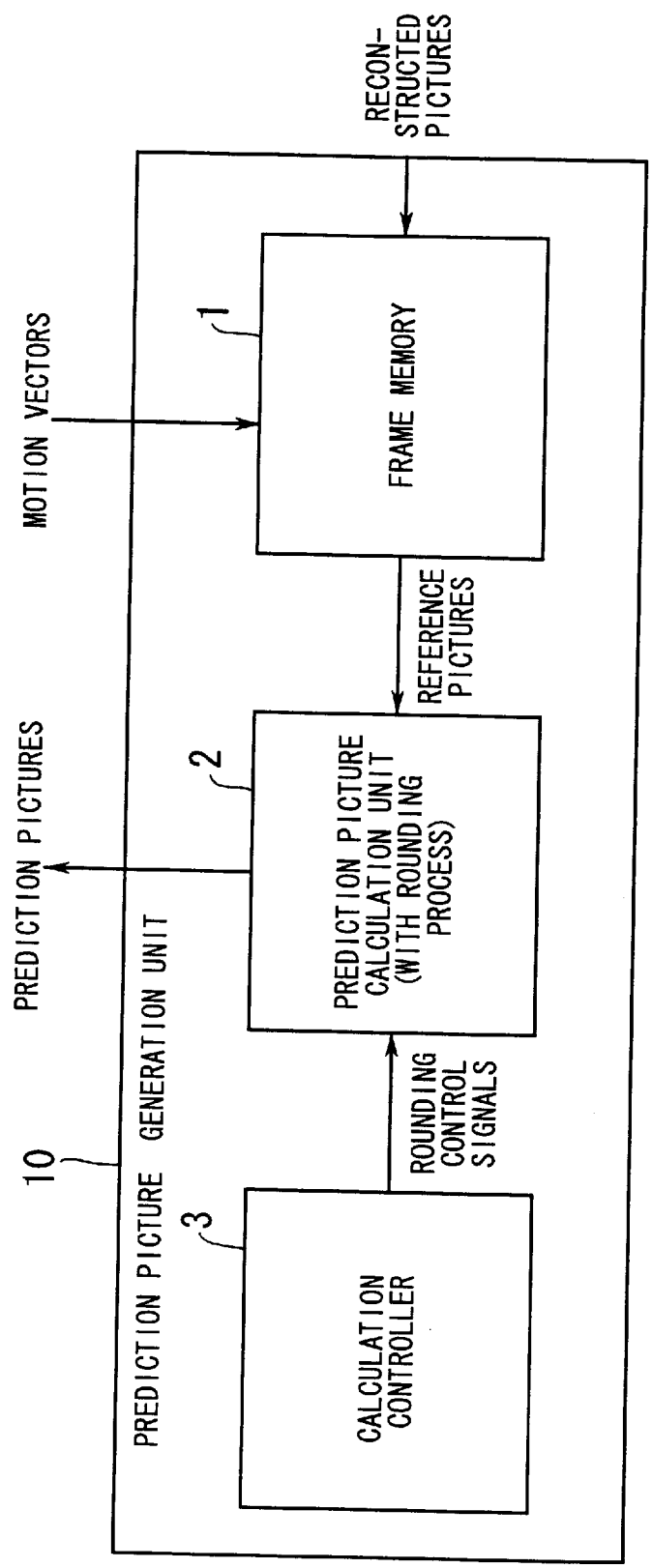
FIG. 1 is a conceptual view of the present invention.

Referring first to FIG. 1, the following section explains the concept of a first embodiment of the present invention, which is an interframe predictive video coder equipped with a prediction picture generation unit 10 that produces prediction pictures from reproduced video images and motion vectors. This prediction picture generation unit 10 comprises the following key elements:

(a) a frame memory 1 which stores a video image reconstructed as a reference picture and outputs at least one reference picture according to motion vector information;

(b) a prediction picture calculation unit 2 which produces a prediction picture by interpolation operations including a rounding process, based on the at least one reference picture supplied from the frame memory 1 according to the motion vector information; and (c) a calculation controller 3 which controls the rounding process performed by the prediction picture calculation unit 2.

The prediction picture calculation unit 2 is configured to provide two algorithms for the rounding process. The first algorithm rounds pel values toward positive infinity, while the second algorithm rounds pel values toward negative infinity. The calculation controller 3 generates a rounding control signal to select either of those two algorithms with substantially equal probabilities of occurrence.

In the above-described configuration, the frame memory 1 provides the prediction picture calculation unit 2 with at least one reference picture displaced in accordance with motion vector information. The prediction picture calculation unit 2 produces a prediction picture by performing interpolation with a rounding process, based on the reference picture supplied from the frame memory 1. Here, the calculation controller 3 controls what rounding algorithm to use in the interpolation. More specifically, the prediction picture calculation unit 2 is designed to execute the first rounding algorithm (round toward positive infinity) or the second rounding algorithm (round toward negative infinity). The calculation controller 3 outputs a rounding control signal so that the prediction picture calculation unit 2 will select either of those two algorithms with substantially equal probabilities of occurrence.

As explained earlier, the rounding errors would accumulate continuously as long as the rounding direction is set to a fixed direction. However, if the rounding direction is adaptively changed from positive infinity to negative infinity, or vise versa, at the occurrence ratio of about 1:1, such rounding errors never accumulate but will cancel each other out. This mechanism promises the reproduction of high quality pictures.

Figure 2:
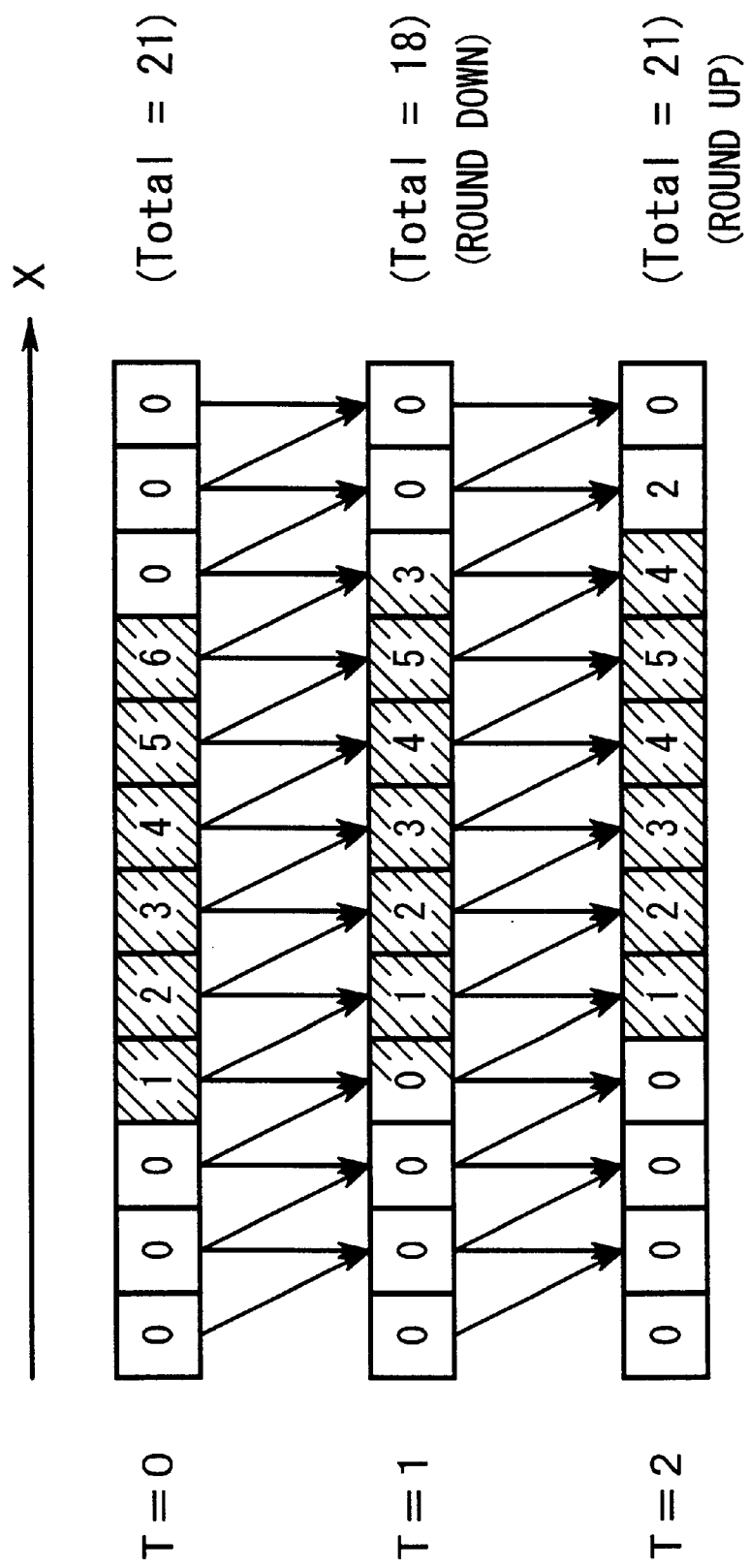
FIG. 2 is a diagram which shows pel values of a prediction picture when the direction of rounding operation is switched alternately at every frame transition.

FIG. 2 presents an example of a prediction picture sequence, focusing on a particular line, in the case that the rounding direction is alternately switched from one to the other at every frame transition. It is notable that the summation of pel values in the third frame T=2 exhibits the same value as that in the initial frame T=0.

To yield such a result, it is important to find appropriate events that occur with substantially even probabilities. For example, the least significant bit (LSB) of the frame counter mentioned earlier will give a value of 0 or 1 alternately. Another possible resource is the LSB of the integer part of motion vector components, which are calculated as spatial displacement of a group of pels to be coded as a single unit (e.g., a macroblock in the MPEG-1 and MPEG-2 standards).

The above-outlined first embodiment will now be explained in more detail. The following explanation includes both video coders and decoders, because the concept of the first embodiment covers not only interframe prediction coders, but also encompasses such video decoders that reproduce video signals from a bitstream encoded by the proposed coders.

Figure 3:
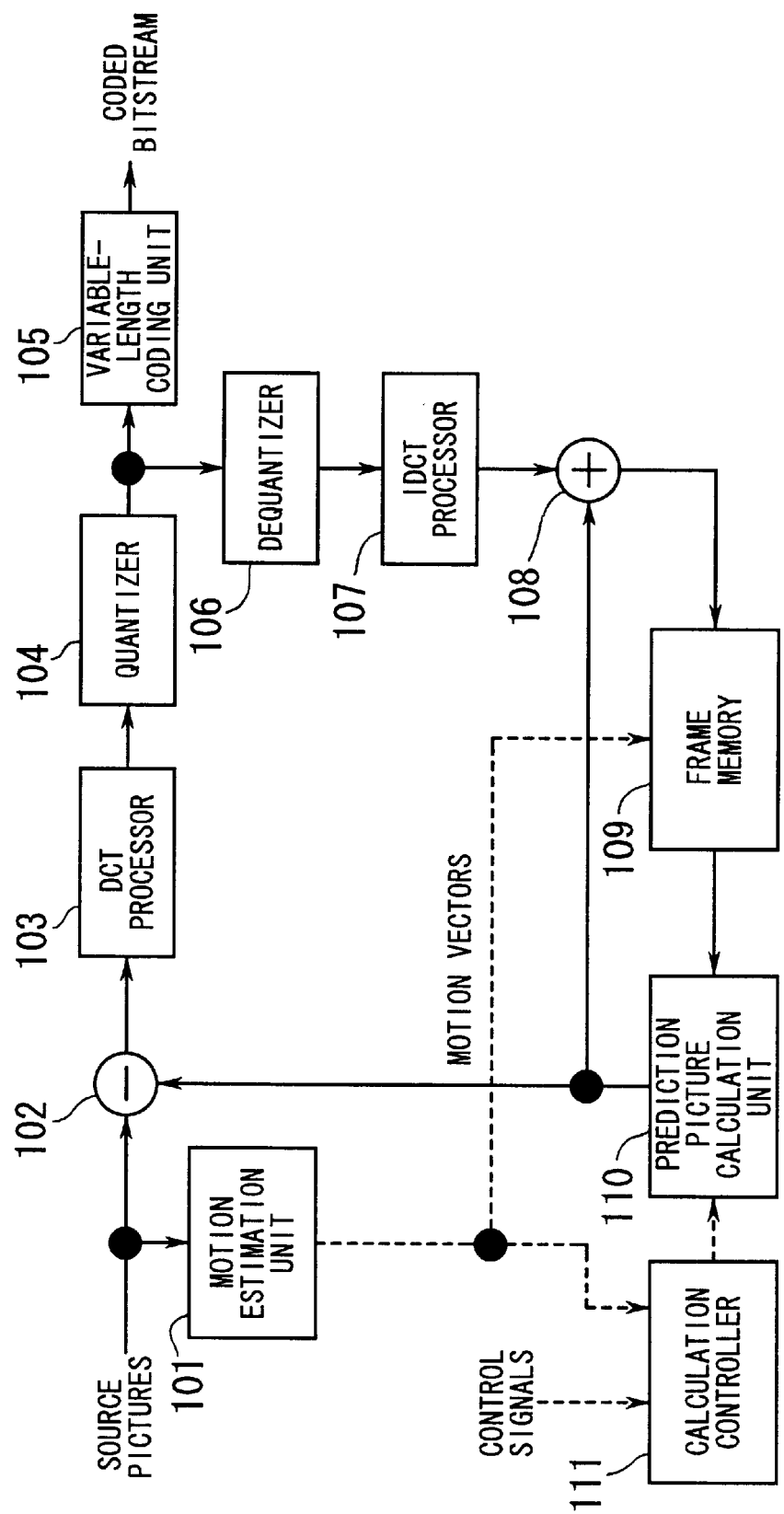
FIG. 3 is a diagram which shows the total structure of an interframe predictive video coder according to a first embodiment of the present invention.

FIG. 3 depicts the total structure of an interframe predictive video coder according to the first embodiment of the present invention. A motion estimation unit 101 calculates a motion vector from consecutive source pictures. (Note that the calculation of motion vectors is not restricted to what is illustrated in the present description. For example, motion vectors can be obtained by comparing a locally decoded picture with a source picture) A subtractor 102 calculates the difference between the source picture and the output of a prediction picture calculation unit 110. A digital cosine transform (DCT) processor 103 and a quantizer 104 apply a DCT process and quantization to the difference signal produced by the subtractor 102. A variable-length coding unit 105 outputs a coded bitstream by encoding the quantized difference information received from the quantizer 104 into variable-length codewords. In addition to the video image information, the variable-length coding unit 105 further encodes various control data including motion vector information supplied from the motion estimation unit 101, although this data path is not shown in FIG. 3.

As part of the coder loop, a dequantizer 106 and inverse DCT (IDCT) processor 107 respectively apply a dequantization process and inverse DCT process to the quantized difference information supplied from the quantizer 104, thus reproducing the interframe difference information. An adder 108 reconstructs a picture by adding this interframe difference information reproduced by the IDCT processor 107 to a prediction picture signal produced by the prediction picture calculation unit 110. This picture is referred to as a decoded picture, which is now transferred from the adder 108 to a frame memory 109 for storage.

The frame memory 109 also receives motion vector information from the motion estimation unit 101, which information serves as an offset address when the memory contents are read out. The frame memory 109 outputs displaced picture data relevant to a given motion vector. The prediction picture calculation unit 110 produces a prediction picture from the picture data supplied from the frame memory 109. In this picture prediction process, pel values on the half-pel grids are calculated from the values of adjacent pels by interpolation. The interpolation process supports two types of rounding algorithms that round up or down each interpolated pel value to an appropriate integer value. A calculation controller 111 determines which algorithm (i.e., round up or round down) to use in the prediction picture calculation unit 110, on the basis of the motion vector supplied from the motion estimation unit 101 in conjunction with other control signals available. The full details of the prediction picture calculation unit 110 and calculation controller 111 will be separately explained later on.

Figure 4:
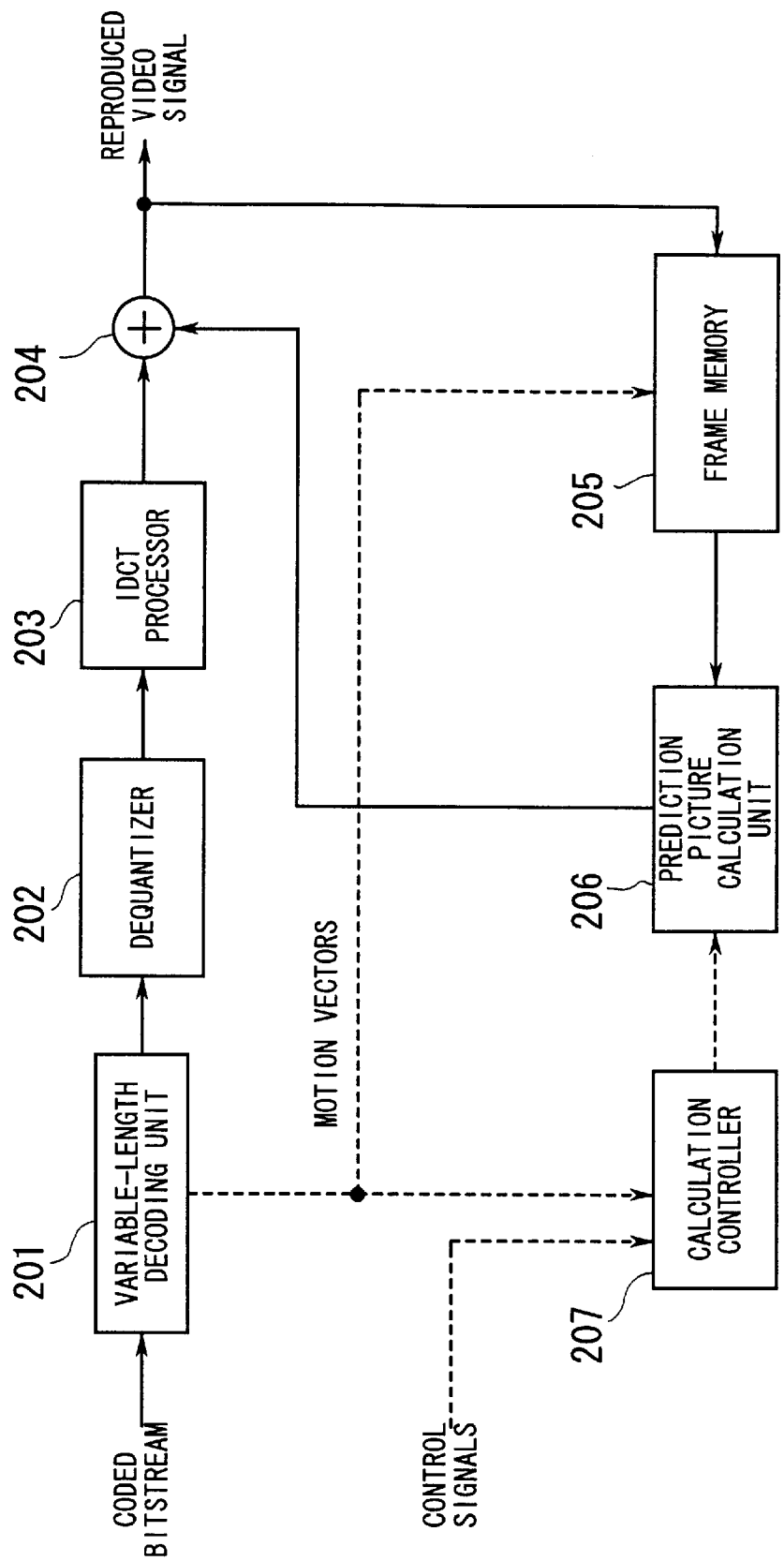
FIG. 4 is a diagram which shows the total structure of an interframe predictive video decoder according to the first embodiment of the present invention.

FIG. 4 shows the total structure of an interframe predictive video decoder according to the first embodiment of the present invention. A coded video bitstream entered to this video decoder is first subjected to a variable-length decoding unit 201 to reproduce quantized picture data, motion vector, and other signals from variable-length codewords. A dequantizer 202 and an IDCT processor 203 respectively apply a dequantization and inverse DCT processes to the quantized picture data supplied from the variable-length decoding unit 201, thus reproducing the interframe difference information. An adder 204 reconstructs a picture by adding this interframe difference information supplied from the IDCT processor 203 to a prediction picture provided by a prediction picture calculation unit 206. The resultant sum is saved into a frame memory 205, as well as being outputted as a fully decoded video signal.

The frame memory 205 outputs picture data relevant to the motion vector given by the variable-length decoding unit 201. The prediction picture calculation unit 206 generates a prediction picture from the picture data supplied from the frame memory 205 by performing interpolation and appropriate rounding operations. A calculation controller 207 controls which algorithm (i.e., round-up or round-down) to use in the prediction picture calculation unit 206, on the basis of the motion vector provided from the variable-length decoding unit 201 and other control signals.

Figure 5:
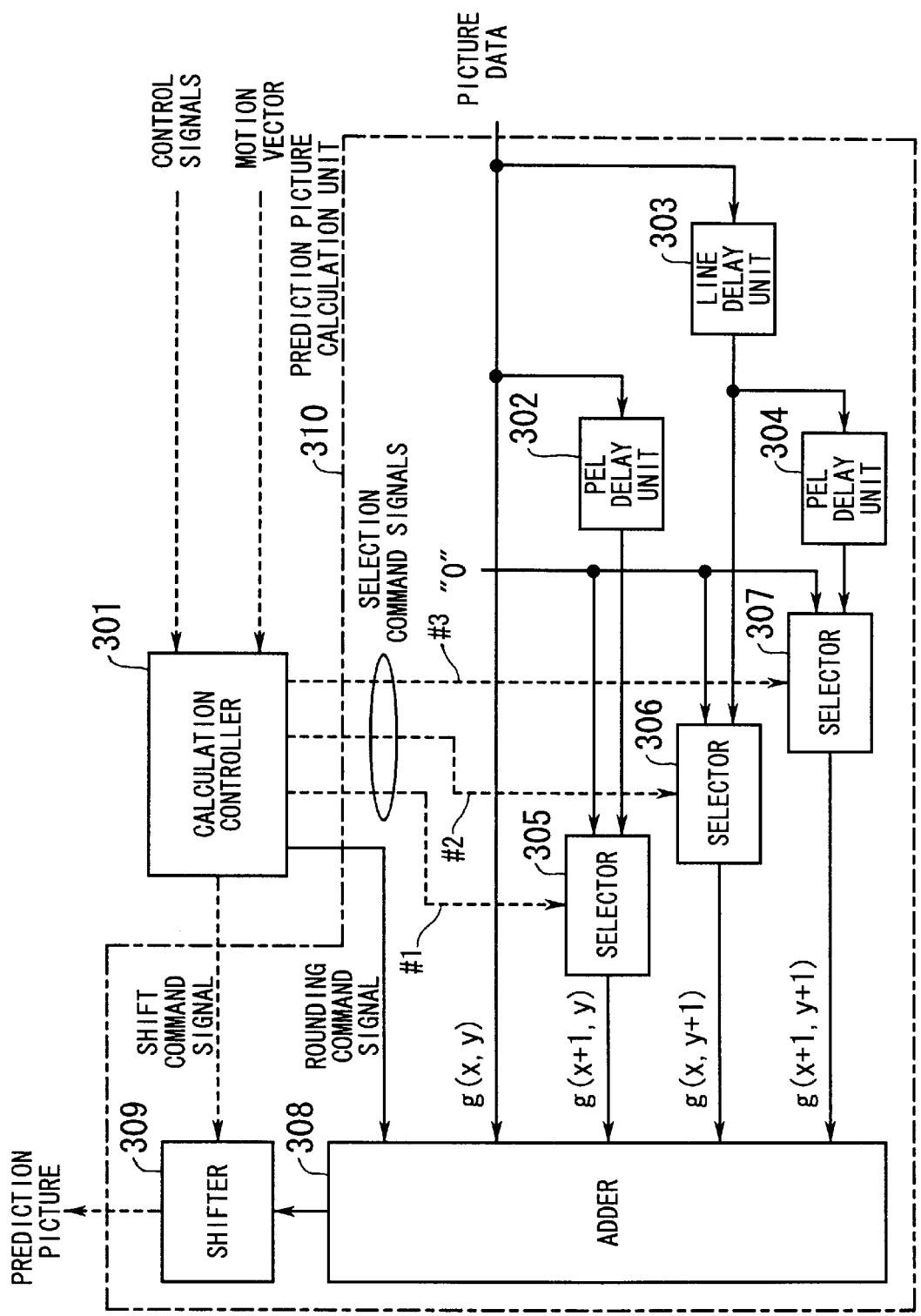
FIG. 5 is a diagram which explains the details of a prediction picture calculation unit and a calculation controller disposed in the interframe predictive video coder and decoder.

Referring to FIG. 5, the following provides the details of the prediction picture calculation units 110 and 206 and the calculation controllers 111 and 207 disposed in the interframe predictive video coder (FIG. 3) and decoder (FIG. 4). Since the prediction picture calculation units 110 and 206 have the same configuration, FIG. 5 shows a prediction picture calculation unit 310 as an equivalent model of them. Similarly, FIG. 5 shows a calculation controller 301 to represent the calculation controllers 111 and 207, which share the same concept.

The calculation controller 301 is responsible for determining the rounding direction by examining given control signals and motion vectors (the detailed decision-making process will be separately described later on). From this rounding direction and the motion vector, the calculation controller 301 determines selection command signals, shift command signal, and rounding command signal to control the internal operation of the prediction picture calculation unit 310. Hereafter, those selection command signals, shift command signal, and rounding command signal are collectively called "rounding control signals."

The prediction picture calculation unit 310 is designed to calculate pel values of a prediction picture by employing a half-pel motion estimation algorithm mentioned earlier in this specification. To implement Equations (2a) to (2d), the prediction picture calculation unit 310 comprises the following elements: two pel delay units 302 and 304, a line delay unit 303, three 2-to-1 selectors 305, 306, and 307, an adder 308, and a shifter 309.

The selection command signals, actually including three separate signals #1 to #3, are supplied to the selectors 305, 306, and 307, respectively. One of the two inputs of the selectors 305, 306, and 307 is fixed to a value of 0, while the other input is connected to a relevant source of pel values. More specifically, the selector 305 is connected to the pel delay unit 302. The selector 306 is connected to the line delay unit 303. The selector 307 is connected to the pel delay unit 304. Picture data g(x, y) is entered from the frame memory 109 or 205 to the pel delay unit 302 and line delay unit 303. The input terminal of the pel delay unit 304 is connected to the output terminal of the line delay unit 303. The pel delay units 302 and 304 put a time delay of one pel interval to given picture data, while the line delay unit 303 inserts a delay of one line interval. The selectors 305, 306, and 307 select the output signals of the pel delay units 302, 304 and the line delay unit 303, when their respective selection command inputs are driven to 1. In turn, when the selection command signals are 0's, they select and output the fixed value of 0.

The shift command signal controls single-bit or multiple-bit shift operations of the shifter 309. According to the value of the shift command signal, this shifter 309 moves binary input data to the right by a given number of bits. The shift command signal can take a value of 0, 1, or 2. When it is set to 0, the shifter 309 outputs the input data as is. With the shift command signal set to 1, the shifter 309 executes a single-bit right-shift operation. Further, with the shift command signal set to 2, the shifter 309 executes a two-bit right-shift operation. Those single-bit and two-bit shift operations are equivalent to integer divisions by 2 and 4, respectively. The details will be separately clarified later.

The rounding command signal, which takes a value of 0, 1, or 2, is entered to the adder 308 to control the rounding algorithm to be used therein. The adder 308 calculates a sum of the following five variables: the picture data g(x, y) directly supplied from the frame memory 109 or 205, the delayed picture data g(x+1, y), g(x, y+1), and g(x+1, y+1) respectively supplied from the selectors 305, 306, and 307, and the rounding command signal from the calculation controller 301.

The following paragraphs explain how the calculation controller 301 deals with the motion vector components and rounding directions. Actually, the calculation controller 301 may face the following four situations, titled "Case 1" to "Case 4," depending on the presence of half-pel components in the motion vector components Vx and Vy.

(Case 1)

Neither of motion vector components Vx and Vy has a half-pel component

In this Case 1, Equation (2a) gives a prediction picture f(x, y) as discussed earlier, where no interpolation of pel values is involved. The calculation controller 301 sets 0's to the three selection command signals #1 to #3, thereby directing the selectors 305, 306, and 307 to output 0's. It then drives the rounding command signal to 0, regardless of the rounding direction, as well as setting the shift command signal to 0. As a result, the adder 308 outputs a prediction picture data g(x, y) alone, and the shifter 309 simply forwards the data to the next stage.

(Case 2)

X-axis motion vector component Vx has a half-pel component but the Y-axis component Vy does not In this Case 2, the prediction picture f(x, y) is obtained by Equation (2b) as discussed earlier. The calculation controller 301 sends the selection command signal #1 having a value of 1 to the selector 305, while giving selection command signals #2 and #3 having a value of 0 to the other selectors 306 and 307. This enables the selector 305 to select the output of the pel delay unit 302 while making the other selectors 306 and 307 output 0's. As a result, the adder 308 receives two reference picture data g(x, y) and g(x+1, y).

The calculation controller 301 then outputs a shift command signal having a value of 1 to the shifter 309 to execute a "divide by 2" operation. This command actually causes a single-bit right-shift operation by the shifter 309, which inherently involves a round-down operation (i.e., round toward negative infinity) on the resultant pel value, because the right-shift operation pushes out, or truncates, the LSB. On the other hand, a round-up operation (i.e., round toward positive infinity) can be realized by further giving a value of 1 to the adder 308 through the channel of the rounding command signal.

In Case 2, the rounding direction can be controlled by setting appropriate values to the rounding command signal. Consider, for example, that reference picture data g(x, y)=2 and g(x+1, y)=3 are given. When the rounding command signal is set to 0, the output of the adder 308 will be 5 (or "101" in binary notation), and a single-bit right-shift operation on this sum will yield an integer value of 2 (or "010" in binary notation). This means that the resultant pel value has been rounded down to the nearest integer toward negative infinity.

When the rounding command signal is set in turn to 1, the adder 308 will now output 6 ("110"). The shifter 309 then applies a single-bit right-shift operation on this value "6," thereby obtaining an integer value of 3 ("011"). In this way, the rounding command signal value "1" makes the resultant pel value rounded up to the nearest integer toward positive infinity.

In the case that the sum of g(x, y) and g(x+1, y) is an even number, the rounding command signal value "1" will not affect the pel value output at all. This is because the shifter 309 truncates the LSB, even if the rounding command signal has set it to 1.

(Case 3) X-axis motion vector component Vx has no half-pel component but the Y-axis component Vy has a half-pel component In this Case 3, the prediction picture f(x, y) is obtained by Equation (2c) as discussed earlier. The calculation controller 301 sends the selection command signal #2 having a value of 1 to the selector 306, while giving the selection command signals #1 and #3 having a value of 0 to the other selectors 305 and 307. This allows the selector 306 to choose the output of the line delay unit 303, while making the selectors 305 and 307 output 0's. Accordingly, the adder 308 receives two reference picture data g(x, y) and g(x, y+1).

The calculation controller 301 outputs a shift command signal having a value of 1 to the shifter 309 to initiate a "divide by 2" operation. This command causes a single-bit right-shift operation by the shifter 309, involving a round-down operation as explained in Case 2.

(Case 4) Both X-axis and Y-axis motion vector components Vx and Vy have a half-pel component In this Case 4, Equation (2d) gives a prediction picture f(x, y) as discussed earlier. The calculation controller 301 sends the selection command signals #1 to #3 having a value of 1 to the selectors 305, 306, and 307. This enables the selectors 305, 306, and 307 to select the outputs of the pel delay unit 302, line delay unit 303, and pel delay unit 304, respectively. As a result, the adder 308 receives four reference picture data g(x, y), g(x+1, y), g(x, y+1), and g(x+1, y+1).

The calculation controller 301 outputs a shift command signal having a value of 2 to the shifter 309 to initiate a "divide by 4" operation. Here, the sum G of g(x, y), g(x+1, y), g(x, y+1), and g(x+1, y+1) can be expressed as 4N, 4N+1, 4N+2, or 4N+3, where N is an integer. That is, the summation performed by the adder 308 results in either one of these four types of values with equal probabilities of occurrence. The rounding process is designed to provide the following results depending on the fractional part of G/4 (i.e., the remainder after dividing G by 4).

(a) When G=4N, the rounding process can be skipped because G/4 has no fractional part to be rounded off. Naturally, no rounding error happens in this case.

(b) When G=4N+1, the fractional part ¼ is truncated. This means that the process rounds off the value toward negative infinity regardless of the rounding directions, introducing a rounding error of −0.25 to the rounded result.

(c) When G=4N+2, the fractional part 2/4 may be rounded up or down in accordance with the rounding direction that has been determined. A round-down operation introduces a rounding error of −0.5 in the result, while a round-up operation causes a rounding error of +0.5.

(d) When G=4N+3, the fractional part ¾ is always rounded toward positive infinity regardless of the rounding directions. In this case, a rounding error of +0.25 is introduced in the result.

Because the occurrences of those 4N, 4N+1, 4N+2, and 4N+3 are considered to be stochastic events with substantially equal probabilities, the rounding errors cancel out with one another (as long as the rounding direction is properly alternated in the case of G=4N+2), and therefore, the expected value of the errors must be zero.

To implement the above-described rounding process of Case 4, the rounding command signal should be set to "1" for round-down operations, and to "2" for round-up operations, in an appropriate manner that meets the probability requirement. FIG. 6 illustrates how the rounding process makes a calculation in each case of 4N, 4N+1, 4N+2, and 4N+3, assuming N=1, where the symbol ">>2" represents a 2-bit right-shift operation.

To summarize the above-described operations of the calculation controller 301, FIG. 7 presents a table of the selection command signals and shift command signal with respect to the presence of half-pel components.

Similarly, FIG. 8 is a summary table of the rounding command signal values generated by the calculation controller 301, with respect to the rounding directions and the presence of half-pel components.

Figure 9:
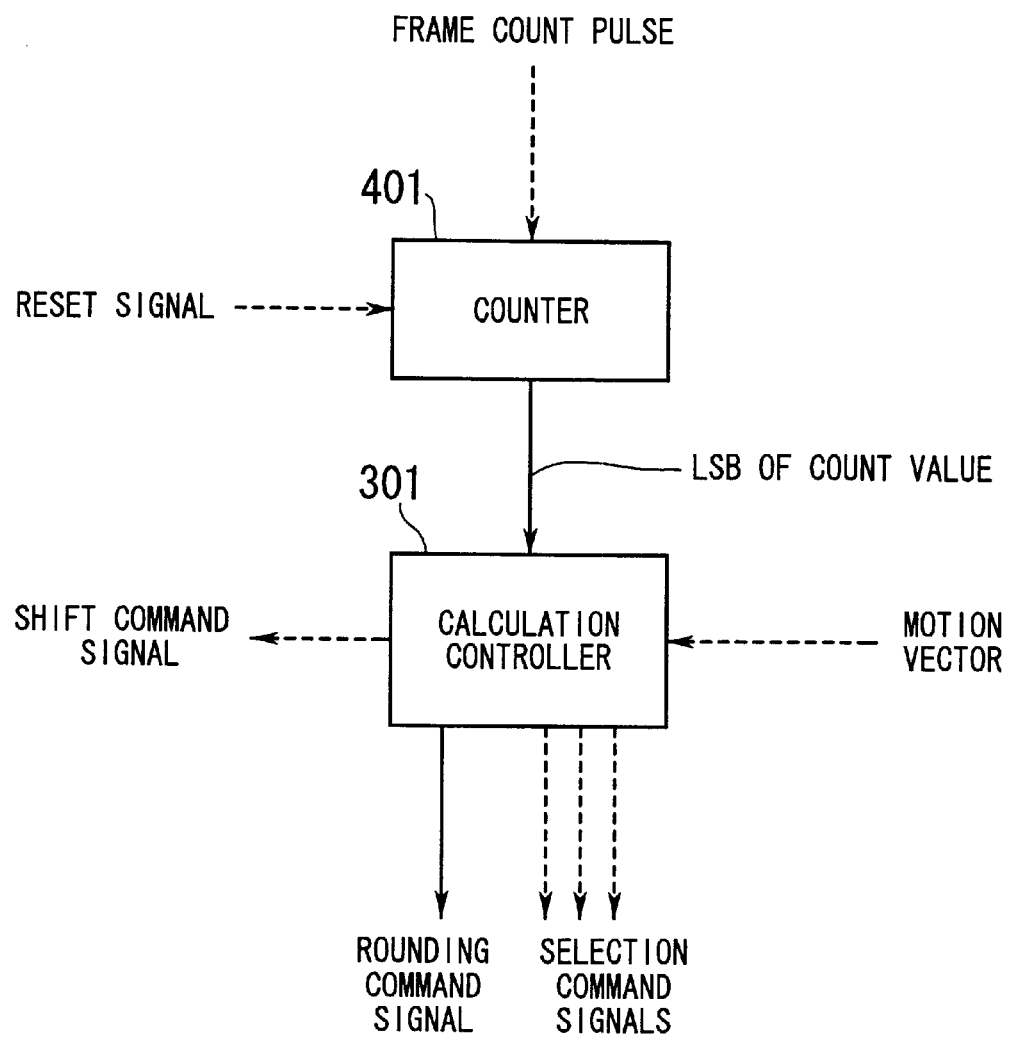
FIG. 9 is a diagram which explains how the calculation controller determines the rounding direction.

Referring now to FIG. 9, the following section will explain how the calculation controller 301 determines the rounding direction.

The calculation controller 301 receives several control signals from a counter 401 coupled thereto. This counter 401 is cleared by a reset signal when the entire system of an interframe predictive video coder or decoder is initialized. After the initialization, the counter 401 receives a frame count pulse at every frame coding or decoding cycle, which increments the counter value by one. The counter 401 supplies the calculation controller 301 with the LSB of its count data output as a control signal, and the calculation controller 301 determines the rounding direction according to this LSB signal. The rounding direction is set, for example, to the positive infinity when LSB=0, and the negative infinity when LSB=1. Apparently, this configuration causes the rounding direction to be switched back and forth at every frame transition.

In the above-described manner, the first embodiment of the present invention prevents the rounding errors from accumulating in the decoded pictures. The techniques proposed herein will allow the local decoder in an interframe predictive video coder, as well as the decoder loop in a video decoder, to reconstruct pictures with high quality. While the above section has explained how to deal with the rounding errors produced in the half-pel motion estimation algorithm, the concept of the first embodiment is not restricted to that particular scheme but applicable to any other prediction methods that conduct interpolation of pel values. The bidirectional frame prediction algorithm mentioned earlier is among such methods.

Now, a second embodiment of the present invention will be described below. The second embodiment, having basically the same structure as that of the first embodiment, offers a distinctive feature implemented in a calculation controller.

Figure 10:
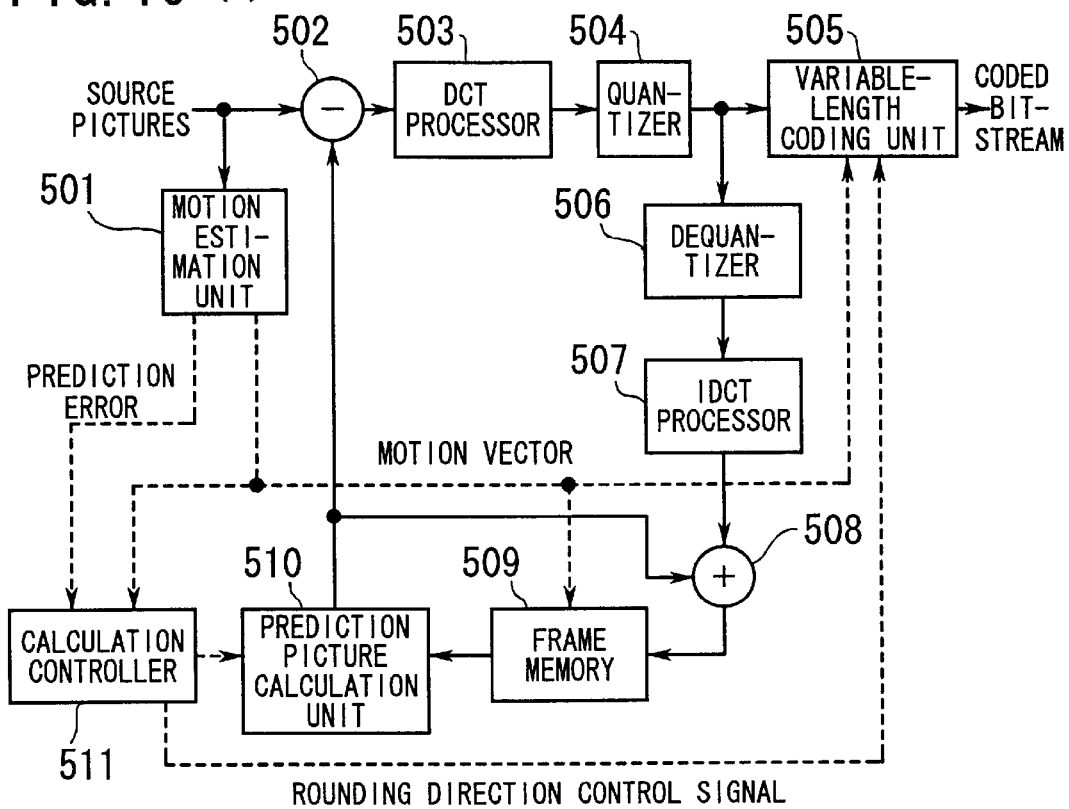
FIG. 10(A) is a diagram which shows the configuration of an interframe predictive video coder according to a second embodiment of the present invention.
FIG. 10(B) is a diagram which shows the configuration of an interframe predictive video decoder according to the second embodiment.
Figure 10:
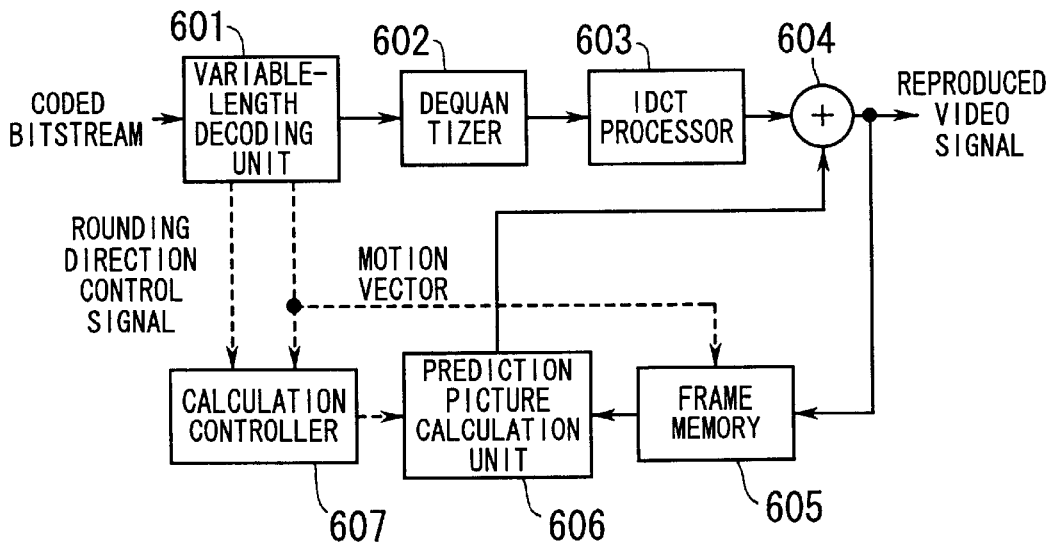

FIGS. 10(A) and 10(B) show the structure of an interframe predictive video coder of the second embodiment and a video decoder designed as its counterpart. The video coder of FIG. 10(A) comprises a motion estimation unit 501, a subtractor 502, a DCT processor 503, a quantizer 504, a variable-length coding unit 505, a dequantizer 506, an IDCT processor 507, an adder 508, a frame memory 509, a prediction picture calculation unit 510, and a calculation controller 511. All those elements are basically the same as what have been explained in FIG. 3 as the elements of the first embodiment. Therefore, the following paragraph will concentrate on distinctive features of the second embodiment, which are implemented in the motion estimation unit 501, calculation controller 511, and variable-length coding unit 505.

In FIG. 10(A), the motion estimation unit 501 calculates motion vectors by comparing consecutive source pictures, as well as estimating prediction errors. The motion estimation unit 501 outputs those two pieces of information to the calculation controller 511 as indicated by the broken lines in FIG. 10(A). Note that the motion estimation unit 501 provides prediction errors for each individual pel or each block of pels. In the latter case, block-based estimation, the prediction error is obtained by summing up the errors of individual pels. The calculation controller 511 determines the rounding direction by evaluating the prediction errors. The rounding process can be configured in such a way that the pel value of interest is rounded toward positive infinity if the LSB of the prediction error (or the sum of prediction errors) is 0, or toward negative infinity if it is 1. The calculation controller 511 also sends a rounding direction control signal to indicate the determined rounding direction to the variable-length coding unit 505. This variable-length coding unit 505 sends out the rounding direction control signal along with other variable-length codewords.

FIG. 10(B) presents the configuration of an interframe predictive video decoder according to the second embodiment. This video decoder comprises a variable-length decoding unit 601, a dequantizer 602, an IDCT processor 603, an adder 604, a frame memory 605, a prediction picture calculation unit 606, and a calculation controller 607. Those elements are basically the same as the corresponding elements 201 to 207, which have been explained in FIG. 4 as the elements of the first embodiment. In the second embodiment, however, the variable-length decoding unit 601 extracts the rounding direction control signal out of the coded video bitstream, and forwards it to the calculation controller 607. Using this rounding direction control signal as is, the calculation controller 607 controls the prediction picture calculation unit 606.

As such, the second embodiment is different from the first embodiment in that the calculation controller 511 receives prediction errors as a control signal to determine the rounding direction, and it creates rounding control signals for local use. At the same time, it sends the information on the rounding direction to the decoder. The calculation controller 607 in the decoder uses the received rounding direction information to generate its local rounding control signals, thereby alternating the rounding direction between positive and negative in synchronization with that in the video coder.

Now, a third embodiment of the present invention will be described. Since the third embodiment has basically the same structure as that of the first embodiment, the following section explains the third embodiment with reference to the video coder and decoder illustrated in FIGS. 3 and 4.

The third embodiment, however, is distinguishable from the first embodiment in the method by which the calculation controllers 111 and 207 decide which rounding direction to use. That is, in the third embodiment, the rounding direction is determined solely from motion vectors, referring to no other control signals. Since motion vectors are transmitted from the coder to the decoder in the form of variable-length codewords, both devices can use them to determine the rounding direction in a consistent manner.

More specifically, the calculation controllers 111 and 207 each perform an exclusive-OR (Ex-OR) operation between the LSB of integer part of the X-axis vector component and that of the Y-axis component, and determines the rounding direction from the resultant value. If the result is 0, the rounding process will round off the interpolated pel values toward positive infinity. If the result is 1, it rounds them toward negative infinity.

For example, when motion vector components Vx=3.5 and Vy=4.0 are given, their respective least significant bits are obtained as LSB(Vx)=1 and LSB(Vy)=0. The Ex-OR operation yields a resultant value of 1, and thus the rounding direction is set to the negative infinity. Here, the function LSB(Vi) gives a value of 1 when the integer part of a motion vector component Vi is an odd number, and 0 when it is an even number. In the third embodiment, the rounding direction is controlled on an individual block basis since motion vectors are calculated for each block of pels.

As described above, the video coder and decoder of the third embodiment determine the rounding directions by using motion vectors which are common to both devices. The calculation controllers 111 and 207 are responsible for this decision making process and generation of rounding control signals on the basis of motion vectors. This motion-vector-based rounding direction control of the third embodiment eliminates the transmission of rounding direction information from coders to decoders, unlike the second embodiment.

As derivative configurations, it is possible to determine the rounding directions by using other information in the coded bitstream transmitted from a coder to a decoder. The quantization step sizes and quantized DCT coefficients, for example, will serve as an alternative to the motion vector components used in the third embodiment.

Lastly, a fourth embodiment of the present invention will be described below.

While having the same basic structure as that of the first embodiment, the third embodiment offers one distinctive feature in what are provided as the counter 401 and calculation controller 301 in the first embodiment. The following will focus on this feature.

Figure 11:
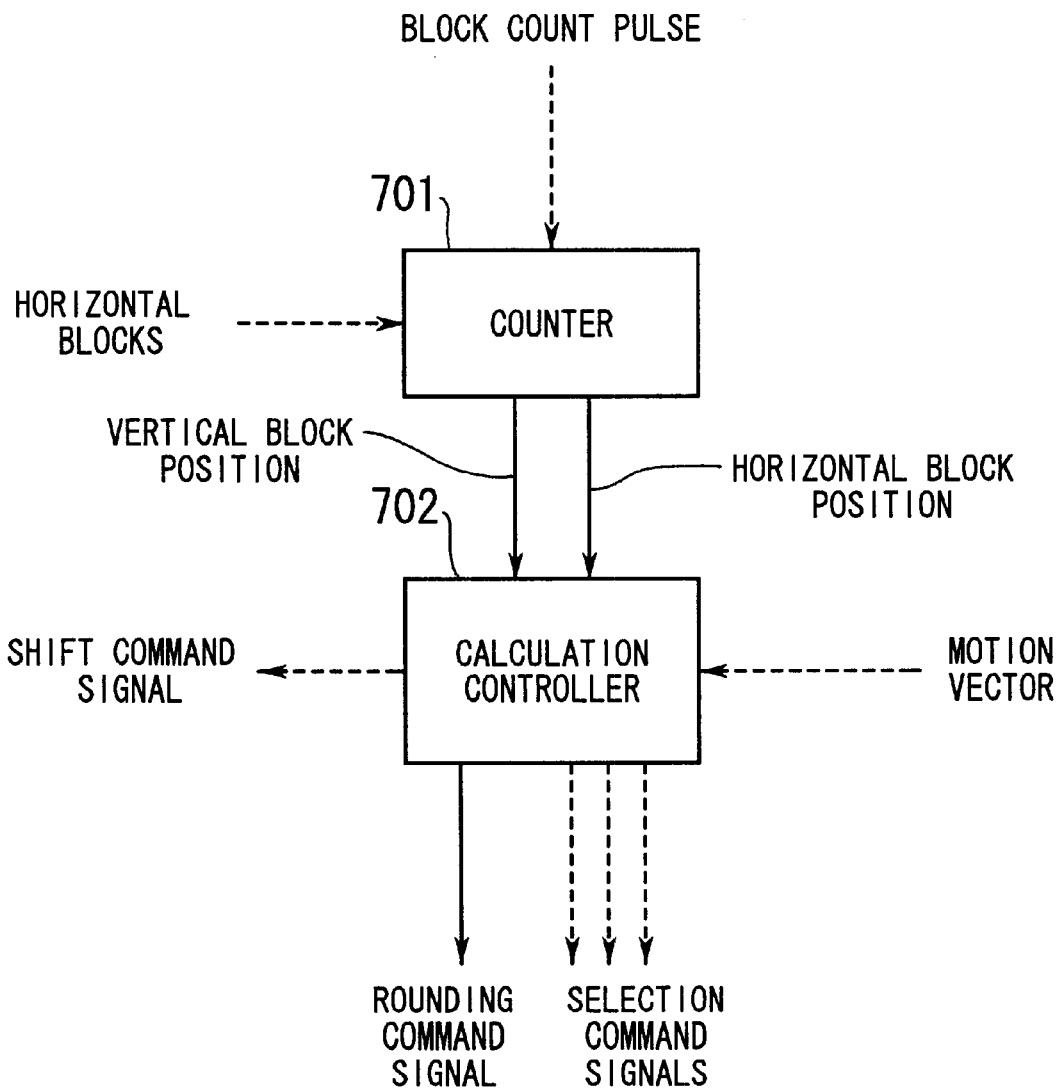
FIG. 11 is a diagram which shows a counter and a calculation controller in a fourth embodiment of the present invention.
Figure 13:
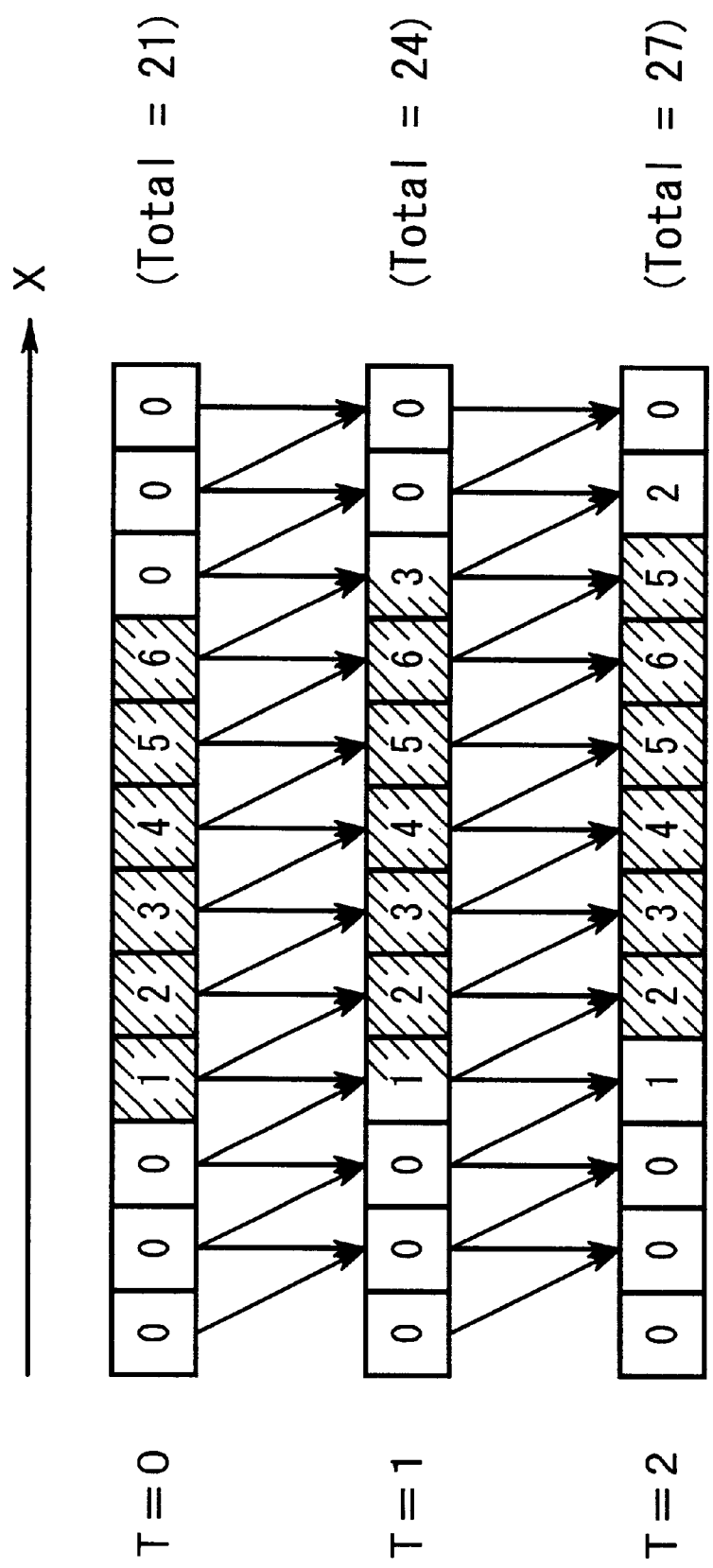
FIG. 13 is a diagram which shows how the rounding errors accumulate in the case that the interpolated pel values are rounded toward positive infinity.
Figure 14:
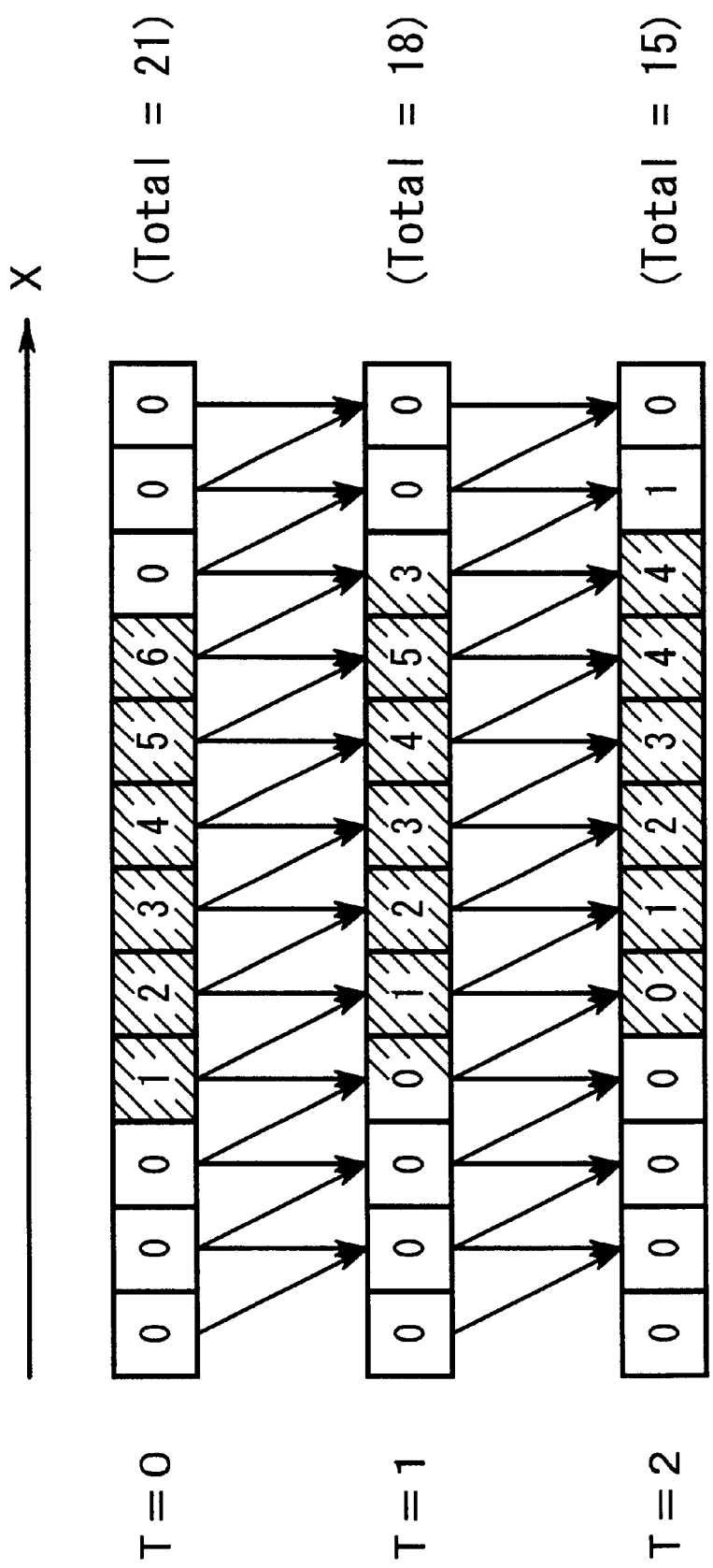
FIG. 14 is a diagram which shows how the rounding errors accumulate in the case that the interpolated pel values are rounded toward negative infinity.
Figure 15:
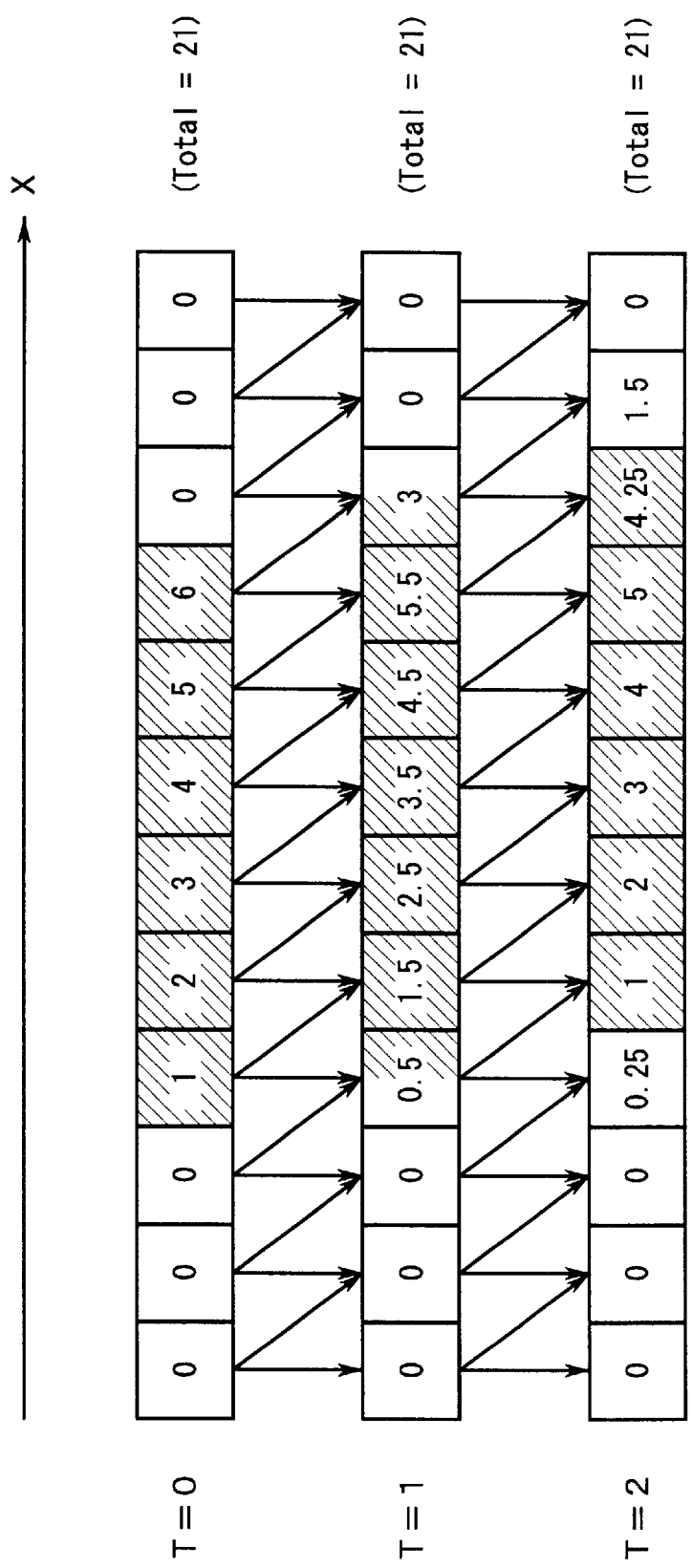
FIG. 15 is a diagram which shows the result of interpolation performed with no rounding operations.

FIG. 11 shows a counter 701 and a calculation controller 702 proposed in the fourth embodiment. The counter 701 receives block count pulses from a controller (not shown) that supervises the video coder or video decoder. As the counter 701 is triggered by the block count pulses, its output value increases from zero to (L-1), where L is the number of blocks constituting a picture. The counter 701 also receives the number (N) of blocks aligned in the horizontal direction, from the abovementioned controller. Using this number N, the counter 701 provides the calculation controller 702 with a horizontal block position X and a vertical block position Y.

More specifically, the horizontal block position X is obtained by the following equation (3).

$$X = M \bmod N \tag{3}$$

where M is a count value of the counter 701, and M mod N represents a modulo arithmetic calculation, or the remainder of integer division M/N.

The vertical position Y is the quotient of the following integer division (4).

$$Y = M/N \tag{4}$$

The calculation controller 702 calculates the rounding direction Z by Equation (5), using the horizontal and vertical block positions X and Y, along with motion vector components Vx and Vy.

$$Z = LSB(X)\hat{\,}(\sim(LSB(Y))\hat{\,}LSB(Vx)\hat{\,}LSB(Vy)) \tag{5}$$

where the symbol "^" is a logical Ex-OR operator, and the symbol "~" is a logical NOT operator. When the above rounding direction Z is 0, the interpolated pel values are rounded toward positive infinity, and when it is 1, toward negative infinity.

As described above, the calculation controller proposed in the fourth embodiment determines the rounding direction for each coded block or decoded block by examining its vertical and horizontal positions and motion vector components. If the decision making process for the rounding direction only relied upon motion vector components, and if the motion vector did not vary for several frames, the rounding direction would remain unchanged for a long period. Even in such a situation, the fourth embodiment will generate both rounding directions with equal probabilities, since the block positions are taken into the decision making process.

The above discussion is summarized as follows. According to the present invention, the prediction picture calculation unit is configured to round off the pel values of prediction pictures according to a positive or negative rounding direction that has been determined appropriately so that both types of rounding operations will occur with substantially even probabilities. This mechanism solves the problems of rounding error accumulation that work against the reproduction of quality pictures, and thus makes it possible to develop video coders and decoders that realize highly-compressed video communications even in a bandwidth-limited environment, such as existing analog telephone lines.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A video coding apparatus for performing an interframe predictive coding, which has a prediction picture generator to produce a prediction picture from a reproduced video image and a motion vector, comprising:

a frame memory, disposed in the prediction picture generator, for storing a video image reconstructed as a reference picture, and outputting at least one reference picture according to motion vector information;

prediction picture calculation means, disposed in the prediction picture generator, for producing a prediction picture by interpolation operations including a rounding process, based on said at least one reference picture supplied from said frame memory according to the motion vector information; and calculation control means, disposed in the prediction picture generator, for controlling the rounding process performed by said prediction picture calculation means.

2. The video coding apparatus according to claim 1, wherein said prediction picture calculation means is configured to round off pel values of the prediction picture by using a first rounding algorithm that rounds off the pel values toward positive infinity or a second rounding algorithm that rounds off the pel values toward negative infinity, and said calculation control means supplies said prediction picture calculation means with a rounding control signal that selects either of the first and second rounding algorithms with substantially equal probabilities of occurrence.

3. The video coding apparatus according to claim 2, further comprising a counter which operates every time a predetermined number of pels are processed, wherein said calculation control means produces the rounding control signal by using a count value of said counter.

4. The video coding apparatus according to claim 2, wherein said calculation control means produces the rounding control signal, based on a component value of the motion vector.

5. The video coding apparatus according to claim 2, wherein said calculation control means produces the rounding control signal, based on coded information to be transmitted from the video coding apparatus to an interframe predictive video decoding apparatus.

6. The video coding apparatus according to claim 2, wherein said calculation control means produce the rounding control signal, based on a component value of the motion vector and a position of a block being coded.

7. The video coding apparatus according to claim 2, further comprising transmission means for transmitting rounding direction information to an interframe predictive video coding apparatus, wherein the rounding direction information is used by said calculation control means to produce the rounding control signal.

8. A video decoding apparatus for decoding predictive-coded pictures, which has a prediction picture generator to produce a prediction picture from a reproduced video image and a motion vector, comprising:

a frame memory, disposed in the prediction picture generator, for storing a video image reconstructed as a reference picture, and outputting at least one reference picture according to motion vector information;

prediction picture calculation means, disposed in the prediction picture generator, for producing a prediction picture by interpolation operations including a rounding process, based on said at least one reference picture supplied from said frame memory according to the motion vector information; and calculation control means, disposed in the prediction picture generator, for controlling the rounding process performed by said prediction picture calculation means.

9. The video decoding apparatus according to claim 8, wherein said prediction picture calculation means is configured to round off pel values of the prediction picture by using a first rounding algorithm that rounds off the pel values toward positive infinity or a second rounding algorithm that rounds off the pel values toward negative infinity, and said calculation control means supplies said prediction picture calculation means with a rounding control signal that selects either of the first and second rounding algorithms with substantially equal probabilities of occurrence.

10. The video decoding apparatus according to claim 9, further comprising a counter which operates every time a predetermined number of pels are decoded from a coded bitstream that has been sent from an interframe predictive video coding apparatus, wherein said calculation control means produces the rounding control signal by using a count value of said counter.

11. The video decoding apparatus according to claim 9, wherein said calculation control means produces the rounding control signal, based on a component value of the motion vector that has been sent from an interframe predictive video coding apparatus.

12. The video decoding apparatus according to claim 9, wherein said calculation control means produces the rounding control signal, based on coded information that has been sent from an interframe predictive video coding apparatus.

13. The video decoding apparatus according to claim 9, wherein said calculation control means produce the rounding control signal, based on a component value of the motion vector sent from an interframe predictive video coding apparatus, as well as being based on a position of a block being decoded.

14. The video decoding apparatus according to claim 8, wherein said prediction picture calculation means changes a rounding method in accordance with rounding direction information sent from an interframe predictive video coding apparatus.

15. A method of coding video images with an interframe prediction technique which produces a prediction picture by interpolation operations with a rounding process, based on at least one reference picture, the method comprising:

adaptively determining a rounding direction as a parameter of the rounding process by selecting either rounding toward positive infinity or rounding toward negative infinity, each time a predetermined number of pels are coded.

16. The method according to claim 15, wherein said selection of the rounding direction is made in accordance with two stochastic events that occur with substantially equal probabilities.

17. The method according to claim 16, wherein values of motion vector components are used as said two stochastic events.

18. The method according to claim 16, wherein said two stochastic events are joint events of values of motion vector components and coordinate values of a position of a block being coded.

19. A method of decoding a video bitstream encoded with an interframe prediction technique, which produces a prediction picture by interpolation operations with a rounding process, based on at least one reference picture, the method comprising:

adaptively determining a rounding direction as a parameter of the rounding process by selecting either rounding toward positive infinity or rounding toward negative infinity, each time a predetermined number of pels are decoded.

20. The method according to claim 19, wherein said selection of the rounding direction is based on two stochastic events with substantially equal probabilities of occurrence pertaining to information sent from an interframe predictive video coding apparatus.

21. The method according to claim 20, wherein said two stochastic events are values of motion vector components.

22. The method according to claim 20, wherein said two stochastic events are joint events of values of motion vector components and coordinate values of a position of a block being decoded.

23. The method according to claim 15, wherein said adaptively determining the rounding direction comprises selecting the rounding direction based upon coded information to be sent from a video coding apparatus to an interframe predictive video decoding apparatus.

24. The method according to claim 23, wherein the rounding direction is selected in accordance with motion vector information within the coded information.

25. The method according to claim 23, wherein the rounding direction is selected in accordance with quantization step size information within the coded information.

26. The method according to claim 23, wherein the rounding direction is selected in accordance with quantization DCT coefficient information within the coded information.

27. The method according to claim 19, wherein said adaptively determining the rounding direction comprises selecting the rounding direction based upon coded information sent from an interframe predictive coding apparatus.

28. The method according to claim 27, wherein the rounding direction is selected in accordance with motion vector information within the coded information.

29. The method according to claim 27, wherein the rounding direction is selected in accordance with quantization step size information within the coded information.

30. The method according to claim 27, wherein the rounding direction is selected in accordance with quantization DCT coefficient information within the coded information.

31. A video coding apparatus for performing an interframe predictive coding, which has a prediction picture generator to produce a prediction picture from a reproduced video image and a motion vector, comprising:

a frame memory, disposed in the prediction picture generator, which stores a video image reconstructed as a reference picture, and outputs at least one reference picture according to motion vector information;

a prediction picture calculator unit disposed in the prediction picture generator, which produces the prediction picture by interpolation operations including a rounding process, based on said at least one reference picture supplied from said frame memory according to the motion vector information; and a calculation controller, disposed in the prediction picture generator, which controls the rounding process performed by said prediction picture calculator unit.

32. The video coding apparatus according to claim 31, wherein said prediction picture calculator unit is configured to round off pel values of the prediction picture by using a first rounding algorithm that rounds off the pel values toward positive infinity or a second rounding algorithm that rounds off the pel values toward negative infinity, and said calculation controller supplies said prediction picture calculator unit with a rounding control signal that selects either of the first and second rounding algorithms with substantially equal probabilities of occurrence.

33. The video coding apparatus according to claim 32, further comprising a counter which operates every time a predetermined number of pels are processed, wherein said calculation controller produces the rounding control signal by using a count value of said counter.

34. The video coding apparatus according to claim 32, wherein said calculation controller produces the rounding control signal, based on a component value of the motion vector.

35. The video coding apparatus according to claim 32, wherein said calculation controller produces the rounding control signal, based on coded information to be transmitted from the video coding apparatus to an interframe predictive video decoding apparatus.

36. The video coding apparatus according to claim 32, wherein said calculation controller produces the rounding control signal, based on a component value of the motion vector and a position of a block being coded.

37. The video coding apparatus according to claim 32, further comprising a transmitter which transmits rounding direction information to an interframe predictive video coding apparatus, wherein the rounding direction information is used by said calculation controller to produce the rounding control signal.

38. A video decoding apparatus for decoding predictive-coded pictures, which has a prediction picture generator to produce a prediction picture from a reproduced video image and a motion vector, comprising:

a frame memory, disposed in the prediction picture generator, which stores a video image reconstructed as a reference picture, and outputs at least one reference picture according to motion vector information;

a prediction picture calculator unit, disposed in the prediction picture generator, which produces a prediction picture by interpolation operations including a rounding process, based on said at least one reference picture supplied from said frame memory according to the motion vector information; and a calculation controller, disposed in the prediction picture generator, which controls the rounding process performed by said prediction picture calculator unit.

39. The video decoding apparatus according to claim 38, wherein said prediction picture calculator unit is configured to round off pel values of the prediction picture by using a first rounding algorithm that rounds off the pel values toward positive infinity or a second rounding algorithm that rounds off the pel values toward negative infinity, and said calculation controller supplies said prediction picture calculator unit with a rounding control signal that selects either of the first and second rounding algorithms with substantially equal probabilities of occurrence.

40. The video decoding apparatus according to claim 39, further comprising a counter which operates every time a predetermined number of pels are decoded from a coded bitstream that has been sent from an interframe predictive video coding apparatus, wherein said calculation controller produces the rounding control signal by using a count value of said counter.

41. The video decoding apparatus according to claim 39, wherein said calculation controller produces the rounding control signal, based on a component value of the motion vector that has been sent from an interframe predictive video coding apparatus.

42. The video decoding apparatus according to claim 39, wherein said calculation controller produces the rounding control signal, based on coded information that has been sent from an interframe predictive video coding apparatus.

43. The video decoding apparatus according to claim 39, wherein said calculation controller produces the rounding control signal, based on a component value of the motion vector sent from an interframe predictive video coding apparatus, as well as being based on a position of a block being decoded.

44. The video decoding apparatus according to claim 38, wherein said prediction picture calculator unit changes a rounding method in accordance with rounding direction information sent from an interframe predictive video coding apparatus.

* * * * *